Oct. 8, 1957 R. N. ECK ET AL 2,809,312
CONTROL FOR POWER OPERATED PRESSES AND THE LIKE
Filed July 1, 1954 2 Sheets-Sheet 1

Inventors
Robert N. Eck
Edwin W. Seeger
By H R Rather
Attorney

Oct. 8, 1957 R. N. ECK ET AL 2,809,312
CONTROL FOR POWER OPERATED PRESSES AND THE LIKE
Filed July 1, 1954 2 Sheets-Sheet 2
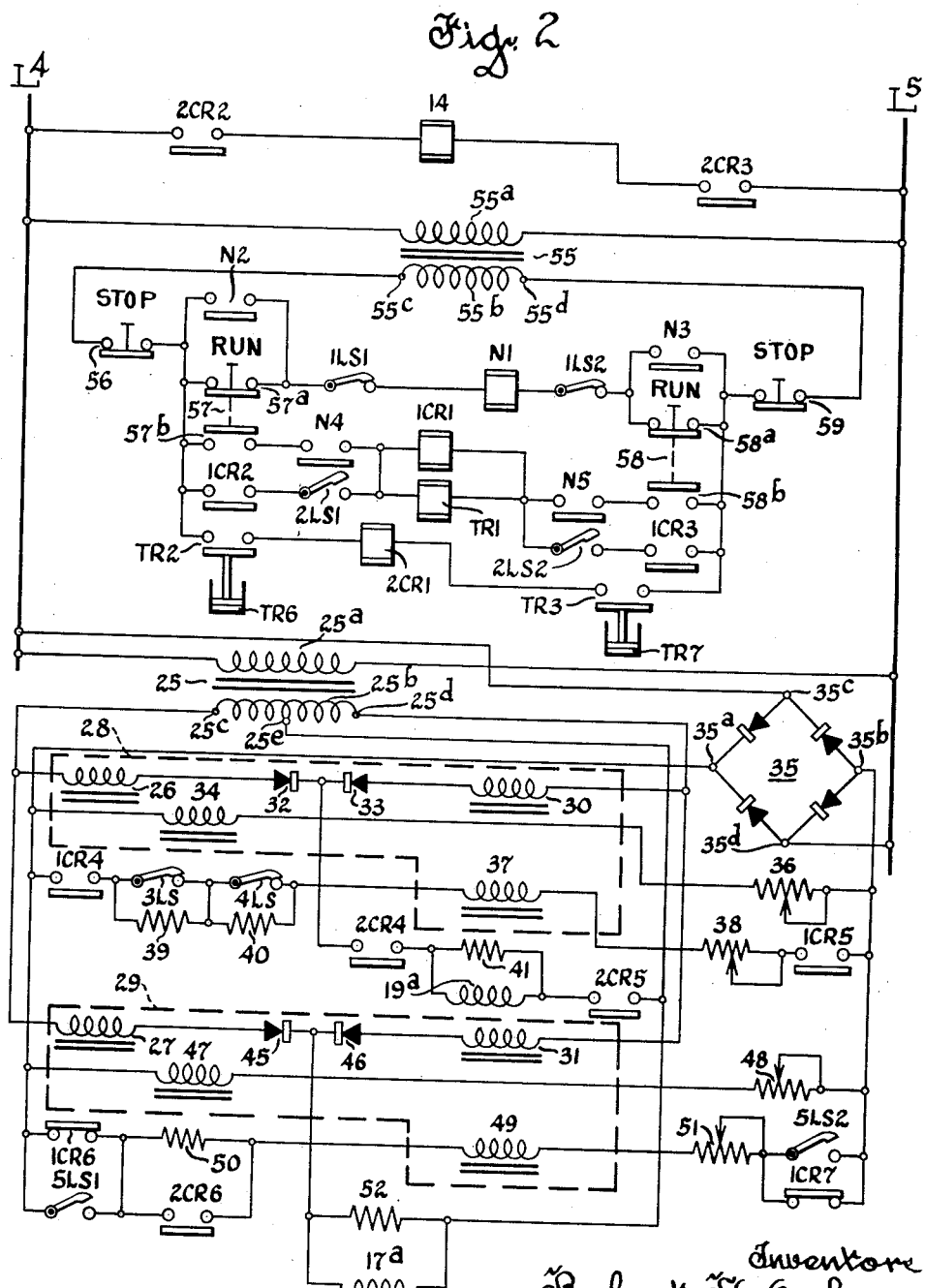

United States Patent Office 2,809,312
Patented Oct. 8, 1957

2,809,312

CONTROL FOR POWER OPERATED PRESSES AND THE LIKE

Robert N. Eck, Whitefish Bay, and Edwin W. Seeger, Wauwatosa, Wis., assignors to Cutler-Hammer, Inc., Milwaukee, Wis., a corporation of Delaware Application July 1, 1954, Serial No. 440,648

5 Claims. (Cl. 310—94)

This invention relates to control means for power operated presses and the like.

In our application Serial No. 435,557, filed June 9, 1954, there is disclosed and claimed a control system for apparatus of the aforementioned type utilizing magnetic flux clutches and brakes and D. C. generators controlled to effect normal, and forcing-reverse energization of such clutches and brakes. It is the object of the present invention to provide a similar type of control, but utilizing magnetic amplifiers in place of the aforementioned generators with attendant simplification of the control system.

Other objects and advantages of the invention will hereinafter appear.

The accompanying drawings illustrate a preferred embodiment of the invention which will now be described in detail, it being understood that the embodiment illustrated is susceptible of modification in respect of details without departing from the scope of the appended claims.

In the drawings:

Fig. 2 is a diagrammatic showing of auxiliary control apparatus for the drive control of Fig. 1.

Figure 1:
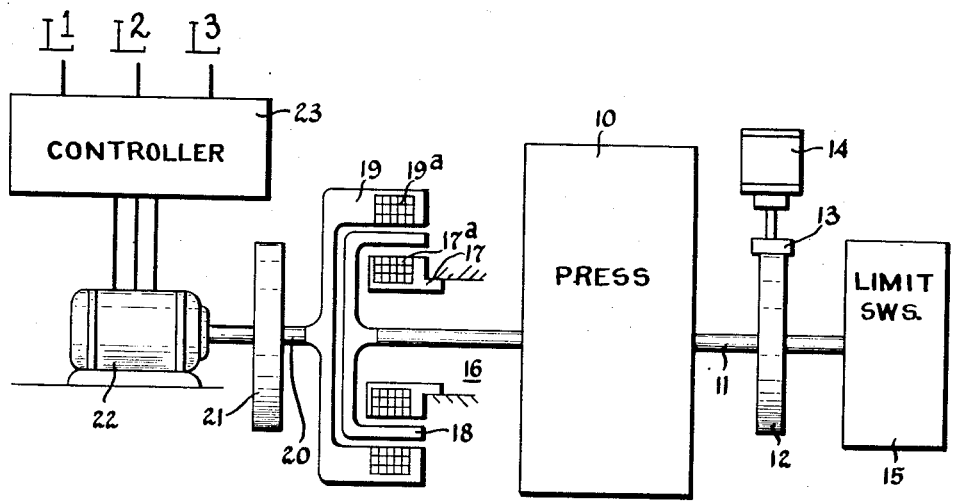
Figure 1 is a schematic showing of a power press and drive control means therefore.

In Fig. 1 there is shown a power press 10 which may be assumed to have a reciprocating ram attached to a crank arm (not shown) that is driven by a shaft 11. A friction brake comprising a drum 12 fixed on shaft 11, a brake shoe 13, and an electromagnetic release coil 14 for shoe 13, is set to hold shaft 11 and the ram driven thereby in stationary position when coil 14 is deenergized. A group of limit switches, generally designated 15 and to be described hereinafter in more detail in connection with Figs. 2 and 3, may be assumed to be operated by shaft 11.

A magnetic flux clutch brake, generally designated 16 and of the type providing driving torque coupling, and retarding braking torque variable in accordance with the degree of energization of control windings, has a stationarily mounted member 17 on which is mounted a brake energizing coil 17ª. The clutch-brake is further provided with a driven induction member 18 fixed on shaft 11 and having a portion in spaced apart, concentric relation with member 17. A driving member 19, having a clutch energizing coil 19ª mounted on an inner face, is fixed on the end of a shaft 20 and the portion of such member containing coil 19ª is in spaced apart, concentric relation with member 18. Shaft 20 has an inertia flywheel 21 fixed thereon, and is driven by a polyphase A. C. motor 22. A controller 23, of any preferred type, is interposed in polyphase A. C. spply lines L1, L2 and L3 and may be assumed to be operable to complete and interrupt power supply to motor 22.

During periods when press 10 is to be used controller 23 is operated to maintain motor 22 energized to continuously drive shaft 20 and flywheel 21. If the friction brake is released by energization of coil 14, shaft 11, and hence the press ram, will be driven in accordance with the energization of clutch coil 19ª and brake coil 17ª. The improved control system affording control of the energization of brake release coil 14, and clutch and brake coils 19ª and 17ª, respectively, will now be described.

As shown in Fig. 2, a source of A. C. voltage supply is provided by lines L4 and L5, which may be assumed to have connection with any two of the supply lines L1, L2 and L3, intermediate motor 22 and controller 23. Thus lines L4 and L5 will be energized whenever controller 23 is operated to supply power to motor 22. A transformer 25 has a primary winding 25ª connected across lines L4 and L5 and is provided with a secondary winding 25ᵇ having end terminals 25ᶜ and 25ᵈ and a center-tap terminal 25ᵉ. End terminal 25ᶜ is connected to corresponding end terminals of A. C. windings 26 and 27 of magnetic amplifiers 28 and 29, respectively, and the other end terminal 25ᵈ is connected to corresponding end terminals of A. C. windings 30 and 31 of amplifiers 28 and 29, respectively.

The other end terminal of winding 26 is connected in series with a half-wave rectifier 32, normally open contacts 2CR4 of an electromagnetic relay 2CR, clutch coil 19ª, and normally open contacts 2CR5 of relay 2CR to center-tap terminal 25ᵉ of transformer winding 25ᵇ. The other end terminal of winding 30 is connected in series with a half-wave rectifier 33 to the point common between rectifier 32 and contacts 2CR4. Amplifier 28 is provided with a D. C. bias winding 34 which is connected at one end to the D. C. terminal 35ª of a full wave rectifier bridge 35, which has another D. C. terminal 35ᵇ, and A. C. terminals 35ᶜ and 35ᵈ connected to A. C. lines L4 and L5, respectively. The other end of winding 34 is connected in series with an adjustable resistor 36 to terminal 35ᵇ. Amplifier 28 is also provided with a D. C. control winding 37 which is connectable at one end to terminal 35ª in series with normally open contacts 1CR4 of an electromagnetic relay 1CR, and limit switches 3LS and 4LS. The other end of winding 37 is connectable to terminal 35ᵇ in series with an adjustable resistor 38 and normally open contacts 1CR5 of relay 1CR. A resistor 39 is connected in shunt across limit switch 3LS, and another resistor 40 is connected in shunt across limit switch 4LS. A discharge resistor 41 is connected in parallel with clutch coil 19ª.

As aforeindicated, A. C. winding 27 of magnetic amplifier 29 is connected at one end to terminal 25ᶜ of secondary winding 25ᵇ, and is connected at its other end in series with a half-wave rectifier 45, and brake coil 17ª to center-tap terminal 25ᵉ of winding 25ᵇ. The other A. C. winding 31 of amplifier 29 is connected at one end, as aforementioned, to end terminal 25ᵈ of secondary winding 25ᵇ, and is connected at its other end in series with a half-wave rectifier 46 to the point common between rectifier 45 and brake coil 17ª. Amplifier 29 is provided with a D. C. bias winding 47 which is connected across the D. C. terminals 35ª and 35ᵇ of rectifier bridge 35 in series with an adjustable resistor 48. Amplifier 29 is further provided with a D. C. control winding 49 which is connected to terminal 35ª in series with a resistor 50 and normally closed contacts 1CR6 of relay 1CR, and is connected at its other end, in series with an adjustable resistor 51 and normally closed contacts 1CR7 of relay 1CR to terminal 35ᵇ. A limit switch 5LS1 is connected in shunt with contacts 1CR6, and under certain condition provides a maintaining circuit connection to winding 49 when contacts 1CR6 are open. Normally open contacts 2CR6 are connected in shunt with resistor 50 and provide, when closed, for effectively shunting such resistor out of the energizing circuit for winding 49. A limit switch 5LS2 is connected in shunt with contacts 1CR7 and when closed provides for maintaining the connection of winding 49 to the rectifier bridge if contacts 1CR7 are open. A discharge resistor 52 is connected in parallel with brake coil 17ª.

If lines L4 and L5 are deenergized, it will be apparent that clutch coil 19ª and brake coil 17ª will likewise be deenergized. When lines L4 and L5 are energized, transformer 25 of course will be energized, and rectifier bridge 35 will be supplying a rectified D. C. voltage across its terminals 35ª and 35ᵇ. Consequently, bias windings 34 and 47 of magnetic amplifiers will be energized. It may be assumed that their energization is so adjusted through adjustable resistor 36 and 48, that both amplifiers are turned full-off. Thus brake coil 17ª and clutch coil 19ª will both be deenergized under such conditions.

When contacts 2CR4 and 2CR5 are closed, clutch coil 19ª is connected in circuit with amplifier 28. Upon closure of contacts 1CR4 and 1CR5 D. C. control winding 37 may be assumed to be energized in such relation to bias winding 34 that the ampere turns of the latter are counteracted and amplifier 28 turned full-on to energize clutch coil 19ª to its maximum predetermined extent. The energization of control winding 37 can be reduced by predetermined amounts by effectively connecting either of the resistors 39 or 40, or both thereof, in series with said winding as will be later described in detail.

Whenever contacts 1CR4 and 1CR5 are closed to afford energization of control winding 37 of amplifier 28, the normally closed contact 1CR6 and 1CR7 will be open, thus disconnecting control winding 49 of amplifier 29 from the source of D. C. voltage. Consequently, brake coil 17ª will be deenergized. On the other hand, when contacts 1CR6 and 1CR7 are closed control winding 49 will be energized to turn amplifier 29 on and thereby energize brake coil 17ª. It will be apparent that under latter conditions contacts 1CR4 and 1CR5 will be open to turn amplifier 28 full-off and thereby deenergize clutch coil 19ª.

Brake release coil 14 is connectable across supply lines L4 and L5 in series with the normally open contacts 2CR2 and 2CR3 of relay 2CR and will be energized whenever these contacts are closed. A second transformer 55 has a primary winding 55ª connected across lines L4 and L5 for energization whenever the latter lines are energized and has a secondary winding 55ᵇ with end terminals 55ᶜ and 55ᵈ. The operating coil N1 of a "non-repeat" relay N is connected at one end to terminal 55ᶜ in series with a normally closed "stop" switch 56, the normally closed contacts 57ª of a "run" switch 57 and a limit switch 1LS1. Coil N1 is connected to terminal 55ᵈ of winding 55ᵇ in series with limit switch 1LS2, the normally closed contacts 58ª of a second "run" switch 58 and a second normally closed "stop" switch 59.

With lines L4 and L5 energized and switches 56, 57, 1LS1, 1LS2, 58 and 59 in the operating condition depicted in Fig. 2, coil N1 will be energized to close its contacts N2, N3, N4 and N5. Contacts N2 and N3 upon closure provide maintaining circuits for coil N1 around contacts 57ª and 58ª of switches 57 and 58, respectively, to thereby insure that such coil is maintained energized until either of the switches 56 and 59, or the limit switches 1LS1 or 1LS2 are opened.

When both contacts 57ᵇ and 58ᵇ of "start" switches 57 and 58 are closed an energizing circuit is completed for the operating coil 1CR1 of a relay 1CR from terminal 55ᶜ through "stop" switch 56, the then closed contact 57ᵇ, the then closed contacts N4, coil 1CR1, the then closed contacts N5, the then closed contacts 58ᵇ and "stop" switch 59 to terminal 55ᵈ of secondary winding 55ᵇ. Coil TR1 of a timing relay TR connected in parallel with coil 1CR1, is likewise energized by completion of the last mentioned energizing circuit. Closure of contacts 1CR2 and 1CR3, together with subsequent closing of limit switches 2LS1 and 2LS2 effects establishment of a maintaining circuit for coils 1CR1 and TR1 as will be hereinafter explained.

Energization of coil TR1 of timing relay TR results in immediate closure of its contacts TR2 and TR3 to complete an energizing circuit for operating coil 2CR1 of an electromagnetic relay 2CR from terminal 55ᶜ through "stop" switch 56, contacts TR2, coil 2CR1, contacts TR3 and "stop" switch 59 to terminal 55ᵈ of secondary winding 55ᵇ. Contacts TR2 and TR3 open with time delay as determined by their associated time delay devices TR6 and TR7. Closure of contacts 2CR4 and 2CR5, as aforementioned, results in connection of clutch coil 19ª to magnetic amplifier 28.

It is a feature of the particular type of magnetic amplifiers used herein, that upon being turned "full-off," following turn-on energization of the same, that the stored magnetic energy in the windings 17ª and 19ª is forced back into the A. C. supply source thereby providing for rapid deenergization of such brake and clutch control windings.

Figure 3:
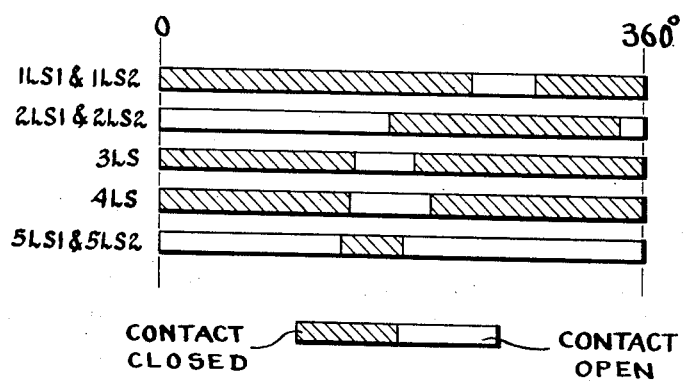
Fig. 3 is a schedule depicting the sequence and duration of operation of certain switches depicted in Fig. 2.

Fig. 3 shows a schedule depicting the operating conditions of the various limit switches shown in Fig. 2. The horizontal cross hatched and clear areas depicted for any limit switch, designate, respectively closed and open operating positions for a single revolution of the press operating shaft 11. It may be assumed that each limit switch is operated by an associated cam fixed on shaft 11 or on an extension thereof to afford the operating cycles depicted in Fig. 2.

The operation of the system as a whole will now be described.

If controller 23 is operated to complete the connections between lines L1, L2 and L3 and motor 22, the latter will be energized to drive shaft 20 and flywheel 21. Lines L4 and L5 will also be energized and thus transformers 25 and 55 will accordingly be energized and rectifier bridge 35 will afford a direct voltage across its terminals 35ª and 35ᵇ.

Coil N1 will be energized to close its contacts N2, N3, N4 and N5. Bias winding 34 of amplifier 28 will be energized to turn the latter full-off. While bias winding 47 of amplifier 29 will be similarly energized, control winding 49 will also be energized to counteract winding 47 and turn amplifier 29 full-on. Brake coil 17ª will accordingly be energized.

Thus if both "run" switches 57 and 58 are depressed to close their respective contacts 57ᵇ and 58ᵇ, coils 1CR1 and TR1 of relays 1CR and TR respectively, will be energized to close contacts 1CR2, 1CR3, 1CR4 and 1CR5, open contacts 1CR6 and 1CR7, and close contacts TR2 and TR3. Accordingly control winding 37 of amplifier 28 becomes fully energized to turn such amplifier "full-on," control winding 49 of amplifier 29 is disconnected from the source of D. C. voltage. Consequently, clutch coil 19ª is fully energized and brake coil 17ª is deenergized. Coil 2CR1 of relay 2CR becomes energized as a result of closure of contacts TR2 and TR3 to complete the energizing circuit for brake release coil 14 to thereby effect release of the friction brake. Thus with the brake released and clutch coil 19ª energized to its predetermined maximum extent, maximum driving torque coupling is build-up between shaft 20 and 11 to rapidly accelerate the press ram downwardly toward the work.

As the press ram closely approaches the work, limit switches 5LS1 and 5LS2 close, closely followed by the opening of limit switches 3LS and 4LS. Thus control winding 49 of amplifier 29 is fully energized to energize brake coil 17ª, and the energization of control winding 37 is reduced by the effective insertion in circuit of resistors 39 and 40 to reduce the energization of clutch coil 19ª. This results in slow down of the ram as it comes into contact with the work. During the interval when limit switches 5LS1 and 5LS2 are closed and limit switches 3LS and 4LS are open, limit switches 2LS1 and 2LS2 close to establish a maintaining circuit for coils 1CR1 and TR1 of relays 1CR and TR, in the event "run" switches 57 and 58 are released prior to the completion of the operating cycle.

Thereafter, limit switches 5LS1 and 5LS2 reopen to deenergize winding 49 of amplifier 29 and thereby effect the deenergization of brake coil 17ª. Shortly thereafter limit switches 3LS and 4LS close in rapid succession to successively disconnect resistors 39 and 40 from the energizing circuit of winding 37 of amplifier 28 to again afford the aforementioned predetermined maximum energization of clutch coil 19ª, and thus drive the press ram at higher speed through the remainder of the forming operation and back up toward its upper normal position.

While the press ram is moving back up to its upper normal position limit switches 1LS1 and 1LS2 momentarily reopen to deenergize coil N1 of relay N, thus requiring release of "run" switches 57 and 58 before coil N1 can again be energized and another operating cycle initiated. Just before, or as, the press ram returns to its upper normal position limit switches 2LS1 and 2LS2 reopen thus effecting deenergization of coils 1CR1 and TR1 of relays 1CR and TR. Accordingly, clutch coil 19ª is quickly deenergized, and brake coil 17ª is fully energized. Shortly thereafter, contacts TR2 and TR3 of relay TR open, thus effecting deenergization of coil 2CR1 and opening of all contacts of relay 2CR. Consequently, brake solenoid 14 is deenergized to permit setting of the mechanical brake, and winding 49 is energized to a reduced degree to afford reduction in the energization of brake coil 17ª.

It will be understood that the present invention is in nowise limited to the particular operating cycle hereinbefore described, and the points of operation of the limit switches and the duration thereof in an operating cycle can be varied to suit particular conditions.

If one or the other, or both steps of reduced energization of clutch coil 19ª is not required, then either or both of the resistors 39 and 40 can be eliminated together with the limit switch 3LS and 4LS.

We claim:

1. The combination with a power operated machine provided with a magnetic flux clutch and magnetic flux brake, of magnetic amplifiers each of which has its output terminals individualized to a respective one of said clutch and said brake and each of which has a D. C. control winding, said magnetic amplifiers each additionally having an input transformer with a secondary winding having a center tap as one of said output terminals, a pair of A. C. main windings connected to respective end terminals of said secondary winding and having a pair of half-wave rectifiers connected together in opposed conducting relation between adjacent ends of said main windings to provide another output terminal at the junction therebetween, and electrical means including control means operable to individually energize said D. C. control windings to preset levels and deenergize the same to correspondingly individually energize said clutch and brake to preset levels and deenergize the same.

2. The combination according to claim 1 wherein said electrical means includes means for adjusting the preset levels of energization of said D. C. control windings.

3. In control means for a power press or the like having an operating shaft, in combination; a magnetic flux clutch energizable to transmit driving torque to said operating shaft in accordance with its energization, a magnetic flux brake energizable to exert retarding torque on said shaft in accordance with its energization, magnetic amplifiers each of which has its output terminals in circuit with a respective one of said clutch and brake and each of which has D. C. bias and control windings, means for energizing the bias windings of the amplifiers to turn them off, and means including control means comprising and being under the direction of a plurality of switches operable in a predetermined relation to the rotation of said operating shaft to energize and deenergize the control windings of said amplifiers to provide in sequence during a single revolution of said operating shaft deenergization of said brake and full energization of said clutch, reduced energization of said clutch and full energization of said brake, full energization of said clutch and deenergization of said brake, deenergization of said clutch and energization of said brake.

4. The combination according to claim 3 wherein said magnetic amplifiers, to provide forcing discharge of magnetic energy stored in said clutch and said brake back into the A. C. supply source following deenergization of the amplifier control windings, have an input transformer with a secondary winding having a center tap as one of their output terminals, a pair of A. C. main windings connected to respective end terminals of said secondary winding and have a pair of half-wave rectifiers connected together in opposed conducting relation between the other ends of said main windings to provide another output terminal at the junction therebetween.

5. The combination according to claim 4 together with a friction brake associated with the press operating shaft and having electroresponsive release means under the control of said control means to respectively afford release and setting of said friction brake at the beginning and end of the aforementioned sequence of magnetic flux clutch and brake operations.

References Cited in the file of this patent

UNITED STATES PATENTS

| | | |
|---|---|---|
| 2,286,777 | Winther | June 16, 1942 |
| 2,551,839 | Jaeschke | May 8, 1951 |
| 2,635,223 | Grillo | Apr. 14, 1953 |
| 2,636,138 | Few | Apr. 21, 1953 |
| 2,697,794 | Jaeschke | Dec. 21, 1954 |